US012569894B2

(12) United States Patent
Vanhoeck et al.

(10) Patent No.: US 12,569,894 B2
(45) Date of Patent: Mar. 10, 2026

(54) SUPERHEATED STEAM AND AIR OVEN FOR THE DISASSEMBLY OF TEXTILE PRODUCTS

(71) Applicant: REGENERATION BV, Waarschoot (BE)

(72) Inventors: Cédric Vanhoeck, Waarschoot (BE); William Allouche, Waarschoot (BE)

(73) Assignee: REGENERATION BV, Waarschoot (BE)

( * ) Notice: Subject to any disclaimer, the term of this patent is extended or adjusted under 35 U.S.C. 154(b) by 0 days.

(21) Appl. No.: 18/699,794

(22) PCT Filed: Oct. 14, 2022

(86) PCT No.: PCT/EP2022/078649
    § 371 (c)(1),
    (2) Date: Apr. 9, 2024

(87) PCT Pub. No.: WO2023/062190
    PCT Pub. Date: Apr. 20, 2023

(65) Prior Publication Data
    US 2024/0399433 A1     Dec. 5, 2024

(30) Foreign Application Priority Data

Oct. 14, 2021  (BE) .................................. 2021/5808

(51) Int. Cl.
    *B09B 3/45*      (2022.01)
    *D01G 11/00*     (2006.01)
    *B09B 101/85*    (2022.01)

(52) U.S. Cl.
    CPC ................ *B09B 3/45* (2022.01); *D01G 11/00* (2013.01); *B09B 2101/85* (2022.01)

(58) Field of Classification Search
    CPC .. B09B 3/45; B09B 3/40; D01G 11/00; B29B 17/02
    See application file for complete search history.

(56) References Cited

U.S. PATENT DOCUMENTS 3,533,154 A * 10/1970 Ward ...................... B25B 27/28
                                                        156/719
5,492,407 A * 2/1996 Gement ................... B01J 19/28
                                                        366/147

FOREIGN PATENT DOCUMENTS

CN        1459522 A      12/2003
EP        3124688 A1 *   2/2017    ............ D06F 58/20
                (Continued)

OTHER PUBLICATIONS

ISR-WO dated Feb. 20, 2023 for parent application PCT/EP2022/078649 (WO2023062190).

*Primary Examiner* — Tajash D Patel
(74) *Attorney, Agent, or Firm* — Vorys, Sater, Seymour and Pease LLP

(57)              ABSTRACT

The current invention relates to a system for disassembling garments that are at least partially assembled with heat sensitive yarn, glues and/or heat-demountable rivets. The system comprises at least one heating chamber in connection with means for providing heated air of a temperature of 100° C. or more or superheated steam to the heating chamber. Said heating chamber having at least one opening through which clothing can enter said heating chamber wherein said system further comprises a rotating drum section, wherein said drum section is located within said heating chamber or configured to be moved in and out said heating chamber. A method of using the system is also disclosed. The system and method provide an energy efficient, non-destructive means by which textile elements of garments can be recovered for further use.

20 Claims, 7 Drawing Sheets

(56)         References Cited

FOREIGN PATENT DOCUMENTS

| | | | |
|---|---|---|---|
| EP | 3845323 | 7/2021 | |
| WO | WO-9958599 A1 * | 11/1999 | ............. B29B 17/02 |
| WO | 2001086052 A1 | 11/2001 | |
| WO | WO-03083193 A1 * | 10/2003 | .............. D02G 3/02 |
| WO | 2019106453 | 6/2019 | |
| WO | 2019131584 A1 | 7/2019 | |
| WO | 2019175766 A1 | 9/2019 | |
| WO | WO-2022250663 A1 * | 12/2022 | |
| WO | 2023062190 A1 | 4/2023 | |
| WO | WO-2024119223 A1 * | 6/2024 | |
| WO | WO-2024157917 A1 * | 8/2024 | |

* cited by examiner

SUPERHEATED STEAM AND AIR OVEN FOR THE DISASSEMBLY OF TEXTILE PRODUCTS

FIELD OF THE INVENTION

The present invention relates devices for processing textile products. In particular, the present invention relates to devices for the disassembly of textile products.

BACKGROUND

Methods for the processing of garments having multiple processes of a different nature are known in the art.

WO0186052 describes a machine comprising a vat, a piping system for circulating dyeing liquid and a perforated rotatable drum removably disposed inside said vat. The machine and processes disclosed in WO '052 include chemical and mechanical processes.

CN1459522A describes a method for removing string or film-shaped polymeric impurity from a natural fiber such as cotton, silk or the like by means of thermal and mechanical processes.

WO2019131584A1 describes a method and device for adding piece-dyeing expression to a polyester fiber clothing product by means of thermo-chemical processes.

A number of methods and device specific for decomposing textile products are known from prior art. These methods and devices include at least thermal and mechanical processes and encompass different degrees of product decomposition.

EP 3845323, in name of Nunn, Karen Joy and entitled "Apparatus for deconstructing textile waste materials" describes an apparatus and a method for thermally, chemically and mechanically treat textile material. The method described in the document includes a first enzymatic process, followed by a thermal treatment and subsequent decomposition of the textile material using mechanical means. The disclosed method results in the transformation of the textile material into fiber material. This transformation results in the destruction of some of the original material making the production of garments from the resulting fibers more costly and potentially lowering the quality of said garments.

WO 2019175766, in name of Regeneration BVBA and entitled "Textile article and method for the production and disassembly of a textile article" describes a method for the production of textile articles, in which the textile articles can be disassembled automatically or semi-automatically because use is made of a polymer melt yarn. The disassembly of the produced article takes place by means of the heating of the article or the yarn to a temperature equal to or higher than the melting temperature, as a result of which the stitching come loose. The method disclosed in this document requires preparatory stages wherein a the textile articles are first exposed to a high temperature and high humidity atmosphere. However, these stages result in textile articles having a high level of humidity, which levels of humidity are detrimental to further heat application stages.

WO 2019106453, in name of Caso, Antonio et al. and entitled "Recyclable quilt" describes a recyclable quilt, a machine and a relative method for recycling quilts and a sewing thread for recyclable quilts. The machine and method include the stages of heating, unstitching and separations of the multiple layers of a quilt into its comprising textile elements. The method is applied to quilts having seams made at least in part using thermally sensitive thread.

The abovementioned documents include methods and devices which either result in excessive material decomposition or the types of textile material they can process. Another limitation of the above mentioned methods and devices lie in the number of processing stages comprising said methods.

The aim of the invention is to provide a method which eliminates those disadvantages. The invention thereto aims to provide device and method which permit the recuperation of reusable textile material and has low associated processing costs.

SUMMARY OF THE INVENTION

The present invention and embodiments thereof serve to provide a solution to one or more of above-mentioned disadvantages. To this end, the present invention relates to a system for disassembling garments that are at least partially assembled with heat sensitive yarn, glues and/or heat-demountable rivets One or more preferred embodiments include a system wherein the heating chamber is provided with a first and a second section before the drum section.

In a further prjeferred embodiment, a method as described is directed at disassembling garments that are at least partially assembled with heat sensitive yarn, glues, and/or heat-demountable rivets. In particular the method includes the use of a system capable of applying thermal and mechanical stress to said garments. In a further preferred embodiment, the method is carried out by means of the system disclosed herein.

DESCRIPTION OF FIGURES

The following description of the figures of specific embodiments of the invention is merely exemplary in nature and is not intended to limit the present teachings, their application or uses. Throughout the drawings, corresponding reference numerals indicate like or corresponding parts and features.

Figure 1:
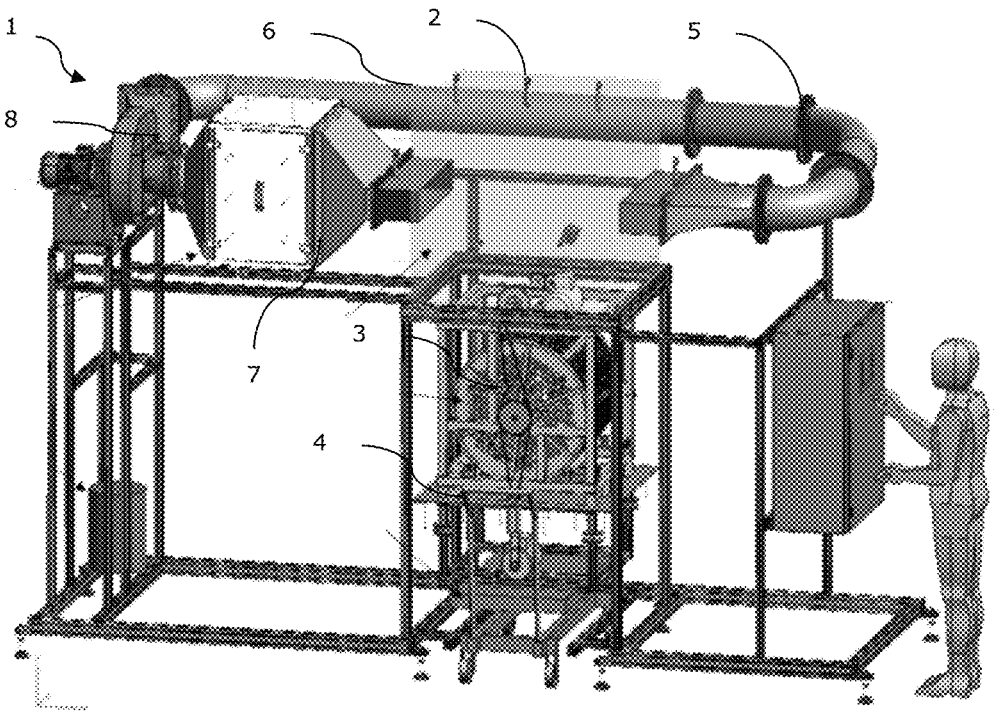
FIGS. 1-2 show a first embodiment of the invention wherein garments are introduced into the system in batches.

It is supposed that the present invention is not restricted to any form of realization described previously and that some modifications can be added to the presented example of fabrication without reappraisal of the appended claims. For example, the heating chamber can be connected to an external super-heated steam circuit.

DETAILED DESCRIPTION OF THE INVENTION

The present invention concerns a system for disassembling garments. In this context, textile products and garments are understood to mean the same and may be used interchangeably. garments comprising a plurality of elements held together by means of heat sensitive yarn, glues and/or demountable rivets. The system operates by applying a thermal and mechanical load to be applied to the garments, causing them to separate into their comprising elements. The system provides separated garments which yield a high level of mechanical integrity, advantageously allowing their reuse.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The recitation of numerical ranges by endpoints includes all numbers and fractions subsumed within that range, as well as the recited endpoints.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In a first aspect, the invention provides a system for disassembling garments that are at least partially assembled with heat sensitive yarn, glues and/or heat-demountable rivets. The system comprises at least one heating chamber in connection with means for providing heated air of a temperature of at least 100° C. or superheated steam to the heating chamber. Said heating chamber having at least one opening through which clothing can enter said heating chamber wherein said system further comprises a rotating drum section comprising a drum, wherein said drum section is located within said heating chamber or configured to be moved in and out said heating chamber. The system permits weakening and breaking down the mechanical properties of any heat sensitive yarns, glues, heat-demountable rivets or buttons by means of thermal and mechanical stress. Said mechanical stress being provided by the rotation of a drum while said yarns, glues, heat-demountable rivets or buttons are still warm.

The term "heat sensitive yarn" refers to a thread with a known melting point or melting temperature, in which the thread melts when it is heated to a temperature within the range of the melting temperature of the thread.

A "yarn" or thread is used to refer to a thread that is made by spinning fibers or to refer to filament yarns, that are basically endless and thus already form a yarn. In the context of the present invention, a distinction is made between "standard yarn" and "heat sensitive yarn".

In an embodiment, the heating chamber has a first and second heating section. By preference, each section of the heating chamber is in connection with means for providing heated air of a temperature of at least 100° C. or superheated steam or heated inert gas. By preference each section has one inlet and at least one outlet for circulating said heated air, superheated steam or heated inert gas. In this way, each chamber can be provided with different heating fluids, which permits different atmospheres to be created within each section.

In an embodiment, said first and second section are located upstream of said drum section. In another embodiment said drum section is located within said second heating section. In either embodiment, each heating section before the drum section permits pre-heating the garments, thus weakening the mechanical properties of any heat sensitive yarns, glues, heat-demountable rivets or buttons before said products enter the drum section. This permits making a more efficient use of the mechanical stress applied by the rotating drum as any heat sensitive yarns, glues, heat-demountable rivets or buttons are already weakened before being subject to said mechanical stress.

In an embodiment, said system comprises a transportation unit, for transporting said garments through at least part of said heating chamber. By preference, said transportation unit is able to operate at a temperature of at least 120° C., more preferably, 150° C., 170° C., 180, 190° C., most preferably above 220° C. By preference, said transportation unit extends from the entrance of the heating chamber to the drum section, more preferably from the entrance of the heating chamber until 200 mm inside the drum section, most preferably 300 mm. In this way effective transportation of the garments into the drum in the drum section is advantageously ensured.

In a further or another embodiment, said transportation element comprises at least two transportation sub-units, wherein each unit may be set to a pre-defined speed. In this way, it is possible to vary the time the garments are exposed to each pre-defined temperature. This is particularly advantageous when varying between garments having synthetic fibers to garments having only natural fibers. By preference, each transportation sub-unit is either a conveyor or a drum. More preferably, the first transportation sub-unit is a conveyor and the second transportation sub unit is a drum. In this way, the garments enter the heating chamber and into a first heating section where said garments are pre-heated, by preference using superheated steam or heated inert gas, followed by second preheating stage inside a drum, and before entering the drum section of the heating chamber. Most preferably each transportation sub-unit is a drum. This permits exposing more of the surface area of the garments to the heated air, superheated steam and/or heated inert gas, thereby guaranteeing a more efficient heat transfer during a preheating stage. In order to improve the conveyance of garments through the inside of each drum, each drum may include reciprocating inserts, rams, screws, ejector plates and/or pins. By preference, each drum is inclined at least 2° to 10° downstream. Yet more preferably, the internal surface of each drum includes pins and/or paddles arranged in a helical pattern extending at least 80%, preferably 90% of the length of said drum. In this way, conveyance of the garments inside of each drum is guaranteed. Most preferably, the protrusion of said paddles and/or pins towards the axis of the drum is adjustable. In this way, the mechanical forces to which the garments are exposed during tumbling are advantageously adjustable. This is particularly relevant when thinner garments are processed.

In an embodiment, one of the sections of the heating chamber is in connection with means to provide air, superheated steam or inert gas heated to a temperature at least 20° C. lower than the temperature of every other section of the heating chamber. More preferably, the drum section is in connection with means to provide air, super-heated steam or inert gas heated to a temperature at least 20° C. lower than the temperature of every other section of the heating chamber. In this way, the separated garments reach a lower temperature before being exposed to the outside of the system, thereby reducing the risk of damage to said separated garments due to oxidation. Most preferably, each section has its own sources of hot air, superheated steam and heated inert gas. Yet more preferably, each inlet of each section of the heating chamber is modulated, for example by means of at least one valve disposed before or to each inlet. In this way the volume and speed of hot air, superheated steam or heated inert gas entering each section can, advantageously, be controlled. Most preferably, also each outlet is modulated, for example by means of at least one valve disposed before or to each outlet. By being able to modulate the inlets and outlets of each section, pressure, humidity, temperature and oxygen concentration inside each section is also controllable. More advantageously still, different pressure, humidity, temperature and oxygen concentration can be set for each section, even if the source if hot air, superheated steam and heated inert gas are the same for all sections.

In an embodiment, the drum in said drum section is equipped with orifices in the drum wall, for allowing the evacuation and/or presorting of disassembled textile components such as buttons. By preference, the orifices are rectangular, circular or elliptical. In this way, heated air, superheated steam and/or heated inert gas will easily permeate through the walls of the drum, increasing heat transfer and thus, the efficiency of the system. More importantly, the orifices of the drum permit automating the separation of the larger pieces of the garments from any smaller pieces of the same garments, which larger pieces then follow different paths in the system. By preference, the orifices have a size between 20 mm and 60 mm. More preferably the drum includes a rotatable cylindrical jacket disposed to the outer surface of said drum, said jacket having orifices similar in size and location to those of the drum. In this way, the orifices of the drum are advantageously adjustable in size. This permits selecting which elements of the garments will fall from the drum during tumbling.

In an embodiment, a collection tray is present below the drum section for collecting said disassembled textile components. This advantageously permits splitting the larger elements of the garments from those of smaller size into at least two output paths and to collect the disassembled textile components for further downstream re-use or recycling.

In a preferred embodiment of the system, the walls of the heating chamber are insulated. In this way, heat exchanges with the outside of the heating chamber are minimized, which advantageously makes using the system both safer and energetically efficient.

In a further or another embodiment, at least one of the walls of the heating chamber includes a platform configured to move at least one drum in and out of the heating chamber. In this way, access to the inside of the heating chamber is made easier for maintenance, and/or loading of the drum. Preferably, the platform includes a surface configured to air-tightly close the heating chamber. This permits avoiding losing hot fluids, particles or heat, which losses would be detrimental to both the efficiency and safety of the system.

In further or another embodiment, the system comprises a fan in fluid connection with a heater, which heater is in further connection with at least an inlet of the heating chamber. By preference, said system has an outlet in fluid connection with a filter, which filter is configured to be in fluid connection with the inlet of the fan. In this way, the system can function in a closed loop, thereby minimizing heat losses, most importantly by means of loss of heat carrying fluids, to the outside of the system. This further, and very advantageously, increases the energy efficiency of the system, thereby reducing costs and environmental impact of using the system.

In a further or another embodiment, the heating chamber is provided with a first opening and a second opening, which first opening is configured to be connected to an incoming first conveyor belt, and which second opening is configured to be connected to an outgoing second conveyor belt. Preferably, the conveyor belts connected to the first and second openings of the heating chamber are further provided with a shroud. In this way, the drum can operate continuously while the shroud permit minimizing heat exchanges with the outside of the system. Preferably, a heat exchanger or secondary duct at the end of the second opening can divert some of the heat towards the space between the incoming conveyor belt and its shroud. In this way, the garments being transported by the incoming conveyor belt are advantageously pre-heated, thereby reducing the tumbling time of the garments, further enhancing the energy efficiency and output of the system. More preferably still, the first conveyor belt and the second conveyor belt are oriented between 10° and 90° longitudinal axis of the heating chamber. In this way, the heating chamber is elevated relative to the input and output openings. This permits taking advantage of the tendency of the warmer less dense gasses to raise. In this way any heating fluid used to heat any part of the heating chamber is advantageously kept in said heating chamber.

In a further or another embodiment, temperature in the heating chamber can be set between 100° C. and 220° C. Preferably, temperature in the heating chamber can be set between 100° C. and 300° C. In this way, multiple types of garments and heat sensitive yarns can be treated while reducing the risk of damaging any part of the garments. Preferably, multiple pre-set temperature modes are made available to the operator by means of a control panel. In this way, the risk of human error is minimized while also minimizing the risk of excessive energy consumption. Still more preferably, temperature in the heating chamber should be at least about 20° C. above the melting point of the heat sensitive yarn.

A second aspect of the invention relates to a method for disassembling garments that are at least partially assembled with heat sensitive yarn and/or heat-demountable rivets said disassembling occurs by means of a disassembling system comprising a heating chamber and a drums section, wherein said garments are entered into said system and. In this method said garments are subjected to air of a temperature of at least 100° C., a heated inert gas or superheated steam while placed under mechanical stress by means of a tumbling and/or rotating motion.

In a preferred embodiment, the method, comprises the steps of:

setting a disassembly temperature to be attained in the heating chamber;

heating and circulating at least one fluid until the set disassembly temperature is attained;

loading the system with garments to be disassembled;

tumbling the garments at the pre-set disassembly temperature in the drum section; and retrieving the disassembled garments from the drum section.

In a further or another preferred embodiment, the steps of loading the drum section with garments and unloading the drum section are done in batches and by providing the operator with direct access to the drum. This permits the use of closed loop system, such that a very high energy efficiency and safety are advantageously maintained during operation.

In a further or another embodiment, the steps of loading the drum with garments and unloading the drum are done continuously and by means of at least one conveyor and/or at least one additional drum. This permits constant operation, and therefore, a higher output.

In an embodiment, the step of loading the drum section with garments to be disassembled is preceded by a step of pre-heating the garments in a first heating section of the heating chamber. By preference, said first section is upstream from the drum section. This advantageously permits reducing the mechanical strength of any heat-sensitive yarn, glue, rivet and/or button before the garments enter the drum. This permits a more efficient use of the full length of the drum to impart mechanical stress upon the garments as said mechanical stress starts to breaks said heat-sensitive yarn, glue, rivet and/or button as soon as the products enter the drum.

By preference, the step of setting a disassembly temperature to be attained in the heating chamber further includes a step of setting a tumbling time of said drum. More preferably, the step of setting a tumbling time further includes a step of setting a pre-heating time. Most preferably, the pre-eating time is equal, preferably longer than the tumbling time. In this way, the tumbling operation in not a bottleneck in the process, which permits avoiding excessive heat transfer to the garments during the pre-heating stage.

In an embodiment, the step of pre-heating the garments is preceded by a step of heating and circulating at least one fluid in the first section until the a temperature at least 20° C. above the set disassembly temperature is attained. By preference, said garments are heated in a two-step heating process, wherein the temperature in the second heating step will be lower, preferably at least 20° C. lower, than the temperature in the first heating step, wherein in at least one step superheated steam is used as source of heating. By preference, the second heating step is carried out inside the drum. In this way, the separated garments leaving the drum have a lower temperature, which temperature is sufficiently low so as to avoid oxidation damage to the garments.

Method according to any of the previous claims, characterized in that, if the oxygen concentration inside the heating chamber is above 10%, heating of the heating chamber is carried out with superheated steam or heated inert gas. In this way, the oxygen concentration inside the chamber is kept lower than 10%, which prevents oxidation damage to the textile material during processing.

In a further or another embodiment, superheated steam is provided to the heating chamber by a steam generator or boiler. As known to those skilled in the art, steam systems are of very common use in a wide variety of industries. By making use of existing steam systems, the cost of acquiring and using the system can be further reduced. Furthermore, steam leaving the garment disassembly system can still be used in other operations with lower heat requirements. The use of superheated steam from sources external to the system permits not only preventing oxidation of the textile material but contribute also to a more efficient overall operation of the plant where the system is operating.

In an embodiment, the fluid used is a heated inert gas. The use of a heated inert gas advantageously displaces the oxygen present in the heating chamber, which permits not only preventing oxidation of the textile material but contribute also to a more efficient overall operation of the plant where the system is operating.

In an embodiment, said disassembling comprises at least partially removing textile components such as buttons, zippers or rivets from said garments, wherein said removed textile components are evacuated from said system by means of orifices present in said drum. By preference, said textile components are evacuated by means of a tray positioned below the drum section. This permits avoiding further separation steps elsewhere in the factory, while allowing easy collection of the smaller elements of the garments.

In an, said method is performed in a system according the first aspect of the invention. Said system permits regulating the both the thermal and mechanical load to which the garments are subject to. In this way, garments having varying degrees thermal and mechanical resilience can be treated.

In order to ensure homogenous heat distribution and sufficient mechanical load is imparted upon the garments during tumbling, the speed of the drum should be at least 30 RPM and up to 50 RPM. Preferably, the rotation speed of the drum should be adjustable.

Tumbling duration varies according to the types and quantity of garments being treated. For example, the system in a closed loop configuration was tested for the disassembly of 14 pairs of jeans. In a first instance, air was used as heat carrying fluid, which air was introduced into the heating chamber at about 10 m/s. The process was carried out for 15 minutes, after which full disassembly of the garments was achieved. In a second instance, the same test was carried out, also for 14 pairs of jeans identical to those treated in the first test. In this second instance, superheated steam was used as heat carrying fluid, said heat being introduced into the heating chamber at about 10 m/s for a period of 10 minutes, after which full disassembly of the garments was achieved.

The invention is further described by the following non-limiting examples which further illustrate the invention, and are not intended to, nor should they be interpreted to, limit the scope of the invention.

DESCRIPTION OF FIGURES

The present invention will now be further exemplified with reference to the following examples. The present invention is in no way limited to the given examples or to the embodiments presented in the figures.

Figure 2:
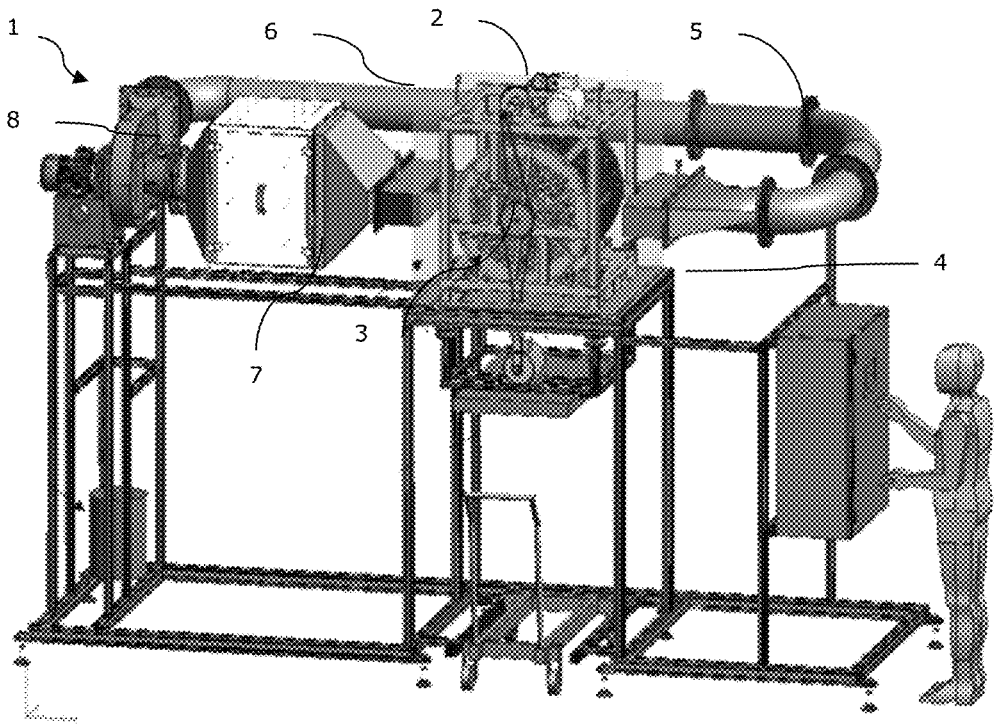

FIGS. 1-2 show a first embodiment of the invention wherein garments are introduced into the system in batches. The system 1 comprises a heating chamber 2. The heating chamber 2 has at least one opening through which a rotating drum 3 is inserted by means of a movable platform 4. A fan 8 is show in fluid connection with a heater 5 by means of piping 6, which piping further connects the heater with the heating chamber 2. The heating chamber 2 is also shown in fluid connection with a filter 7, which filter is further connected to the fan 8. FIG. 1 shows the rotating drum 3 on top of the platform 4, both in a lowered position. FIG. 2 shows the rotating drum 3 on top of the platform 4, both in a raised position, wherein the platform 4 is shown sealing the opening of the heating chamber 2.

Figure 3:
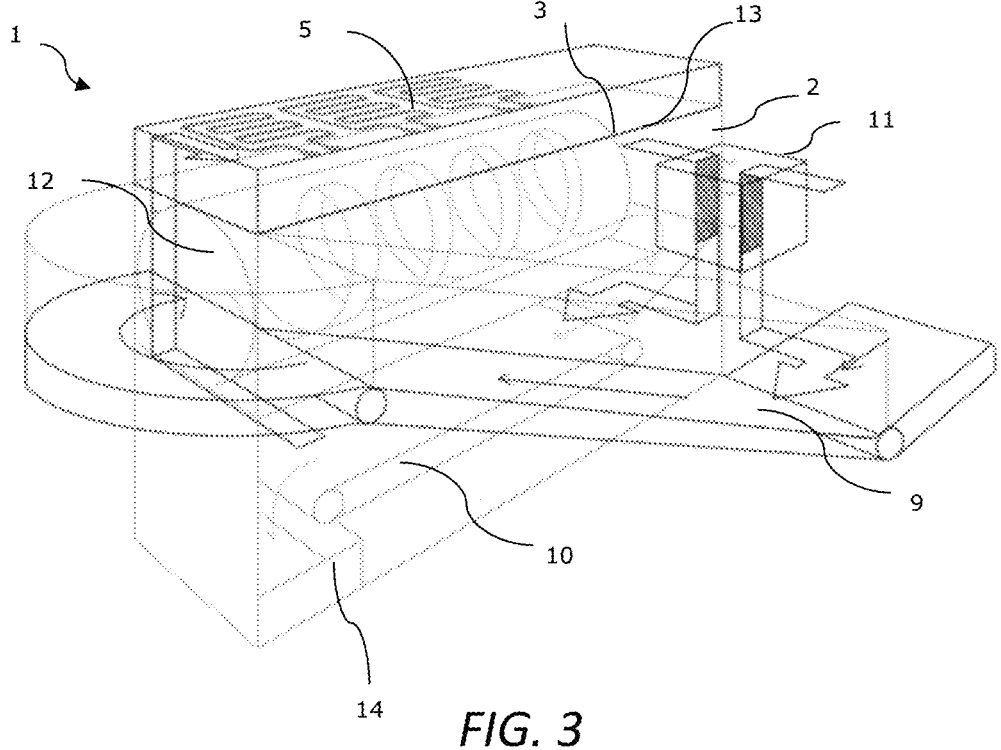
FIG. 3 shows a second embodiment of the inventions wherein garments are continuously introduced into the system and the disassembled pieces of garments are recovered in a tray near the entrance of the system.

FIG. 3 shows a second embodiment of the inventions wherein garments are continuously introduced into the system 1 and the disassembled pieces of garments are recovered in a tray 14 near the entrance of the system 1. In this figure, a heating chamber 2 contains a rotating drum 3 and a heater 5, introduction of garments is carried out by means of a first conveyor 9 in connection with a first end of the of the rotating drum 12. Processed garments exit the rotating drum 3 through a second end of the rotating drum 13, which end is connected to a second conveyor 10, which conveyor brings the processed garments to tray 14. A heat exchanger 11 is shown in fluid connection with the heating chamber 2 near the second end of the rotating drum 13 in order to gather heat from the heating chamber 2 and pre-warm the air on the first conveyor 9.

Figure 4:
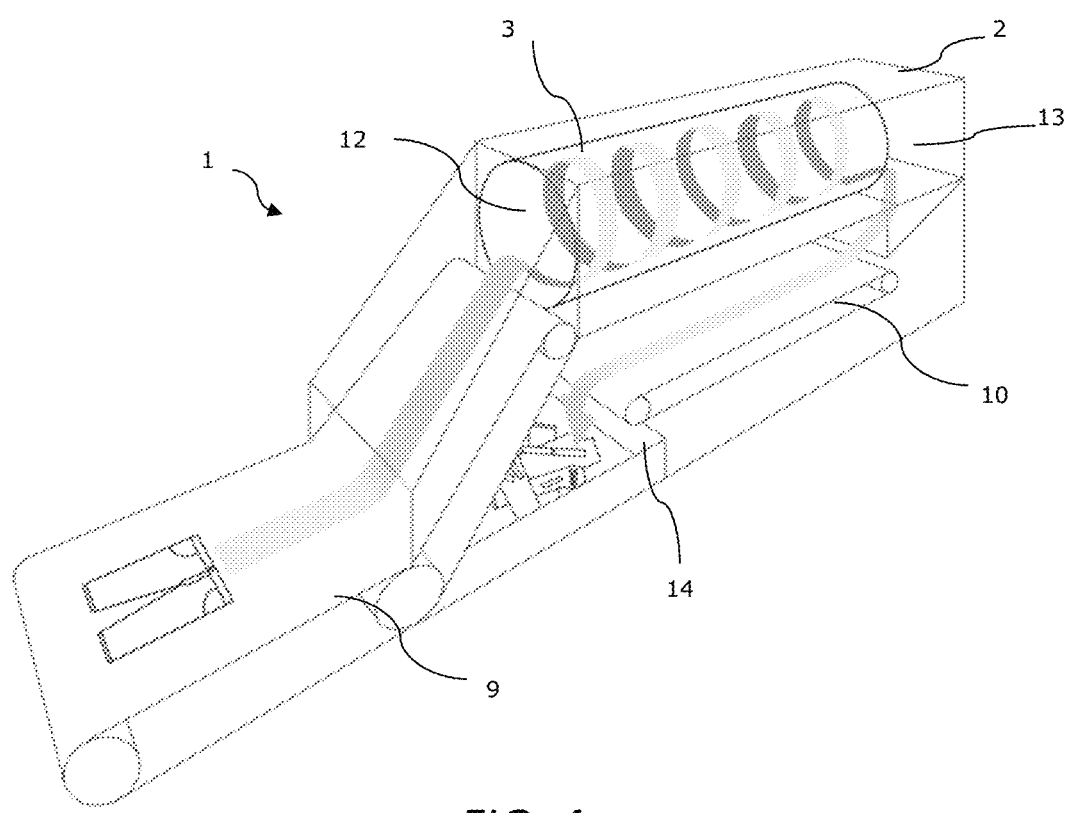
FIG. 4 shows a second embodiment of the inventions wherein garments are continuously introduced into the system and the disassembled pieces of garments are recovered in a tray located in the side of the system opposite to its entrance.

FIG. 4 shows a second embodiment of the inventions wherein garments are continuously introduced into the system 1 and the disassembled pieces of garments are recovered in a tray 14 located in the side of the system opposite to its entrance. In this figure, a heating chamber 2 supplied with super-heated steam from an external steam system (not shown), said heating chamber 2 further contains a rotating drum 3. Introduction of garments is carried out by means of a first conveyor 9 in connection with a first end of the of the rotating drum 12. Processed garments exit the rotating drum 3 through a second end of the rotating drum 13, which end is connected to a second conveyor 10, which conveyor brings the processed garments to tray 14.

Figure 5:
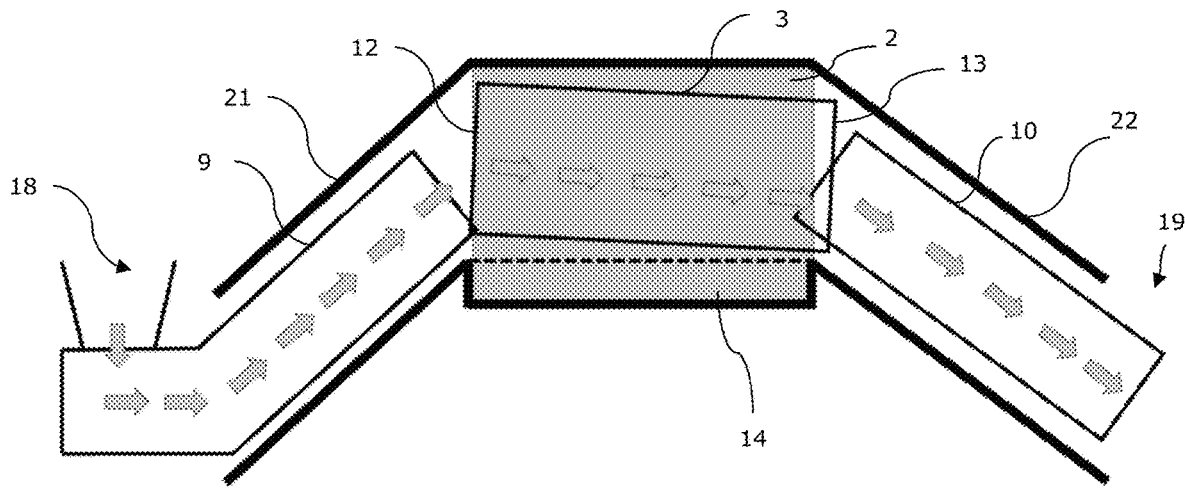
FIG. 5 shows an embodiment of the system wherein the heating chamber is fully occupied by a drum.

FIG. 5 shows an embodiment of the system 1 wherein the heating chamber 2 is fully occupied by a drum 3. A first conveyor 9 is shown disposed between an input opening 18 provides an ingress point for the garments to enter the system 1. In this figure, the input opening 18 is disposed to a first end of the first conveyor 9, said first conveyor 9 being encased in a first shroud 21. Further configurations not shown in this figures may have said input opening 18 disposed to the end of a first shroud 21. The figure further shows a second end of the first conveyor 9 extending into the first end of rotating drum 12, the second end of rotating drum 13 is shown overlapping the first end of a second conveyor 10. The first end of rotating drum 12 is shown located higher than the second end of rotating drum 13 by virtue of the inclination of the drum 3. A second shroud 22 is shown extending from the heating chamber 2, said second shroud 22 enveloping most of the length of the second conveyor 10. The second end of which second shroud 22 defines an output opening for the processed garments. A tray 14 is shown disposed to the bottom of the heating chamber 2 and under the drum 3, said tray 14.

Figure 6:
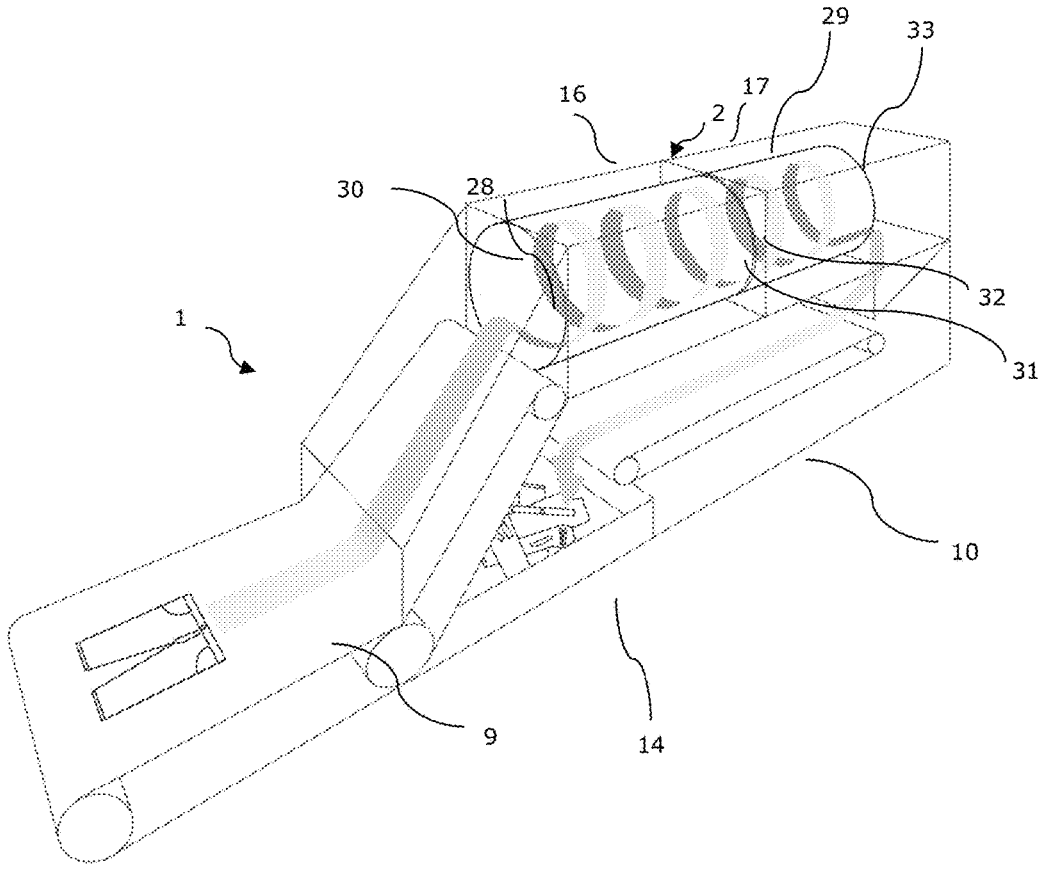
FIG. 6 shows an embodiment of the inventions wherein garments are continuously introduced into the system and passed through a two section heating chamber.

FIG. 6 shows an embodiment of the inventions wherein garments are continuously introduced into the system 1 and passed through a two section heating chamber 2. In this figure, a first section 16 and a second section 17 of the heating chamber 2 are supplied with super-heated steam from an external steam system (not shown), said first section 16 further contains a first rotating drum 28, said second section 17 further comprises a second rotating drum 29. Introduction of garments is carried out by means of a first conveyor 9 in connection with a first end of the of the first rotating drum 30. Garments are passed from the first rotating drum 28 to the second rotating drum 29. The second end of the first drum 31 and the first end of the second drum 32 are shown in communication. Processed garments exit the second rotating drum 29 through a second end of the second rotating drum 33, which end is connected to a second conveyor 10, which conveyor brings the processed garments to tray 14.

Figure 7:
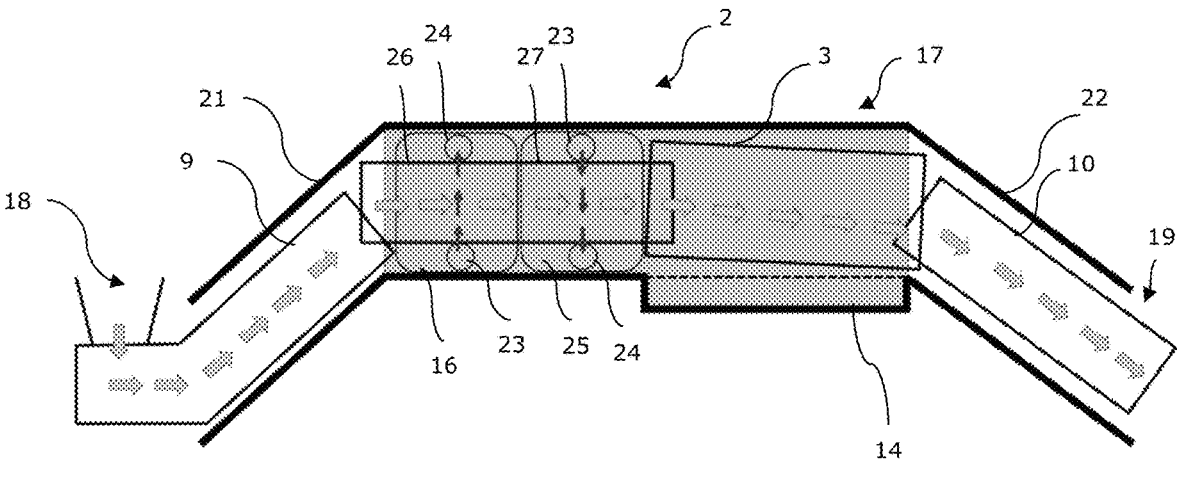
FIG. 7 shows an embodiment of the system wherein the heating chamber has a first section, a second section and a drum section.

FIG. 7 shows an embodiment of the system 1 wherein the heating chamber 2 has a first section 16, a second section and a drum section 17. A first conveyor 9 is shown disposed between an input opening 18 provides an ingress point for the garments to enter the system 1. In this figure, the input opening 18 is disposed to a first end of the first conveyor 9, said first conveyor 9 being encased in a first shroud 21. Further configurations not shown in this figures may have said input opening 18 disposed to the end of the a first shroud 21. The figure further shows a second end of the first conveyor 9 extending into the heating chamber 2. Said heating chamber being shown comprising a first section 16, a second section 25 and a drum section 17. Each section including a heated fluid inlet 23 and a heated fluid outlet 24 (not shown in the drum section). In this figure, the second end of the first conveyor 9 is shown overlapping the first end of a third conveyor 26 disposed to the first section of the heating chamber 16, the second end of which third conveyor 26 is shown in communication with the first end of a fourth conveyor 27 disposed to the second section of the heating chamber 25. The second end if said fourth conveyor 27 is shown reaching inside the drum 3 disposed inside the drum section 17 through the first end of said rotating drum 12. The second end of rotating drum 13 is shown overlapping the first end of a second conveyor 10. The first end of rotating drum 12 is shown located higher than the second end of rotating drum 13 by virtue of the inclination of the drum 3. A second shroud 22 is shown extending from the heating chamber 2, said second shroud 22 enveloping most of the length of the second conveyor 10. The second end of which second shroud 22 defines an output opening for the processed garments. A tray 14 is shown disposed to the bottom of the heating chamber 2 and under the drum 3, said tray 14.

Figure 8:
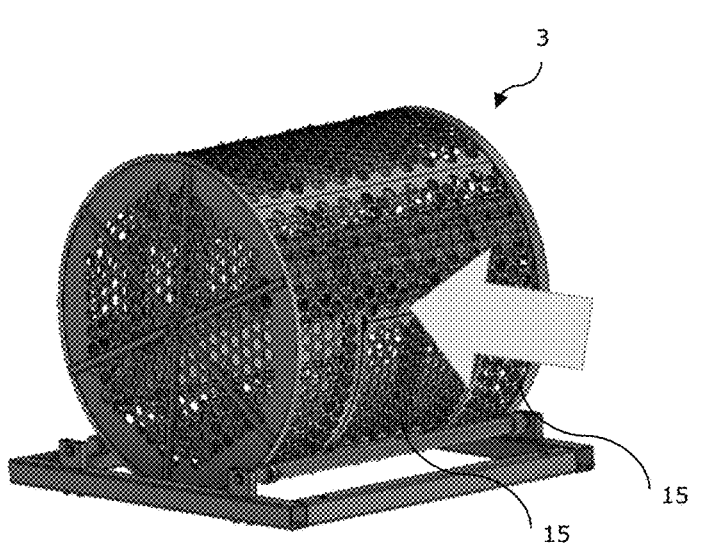
FIG. 8 shows an embodiment of the drum having orifices for small pieces of textile and rivets.

FIG. 8 shows an embodiment of the drum 3 having orifices 15 for small pieces of textile and rivets. Said orifices 15 are shown uniformly distributed throughout the walls of the drum 3. The drum 3 shown in the figure further includes two closed end. A door 20 is provided on the side walls of the drum 3. In this configuration, the 5 is suitable for batch loading. Other configurations of the drum 3 not shown in the figure, are directed at continuous processing and provided with open ends to permit continuous ingress and exit of garments.

Figures 9, 10, 11, 12:
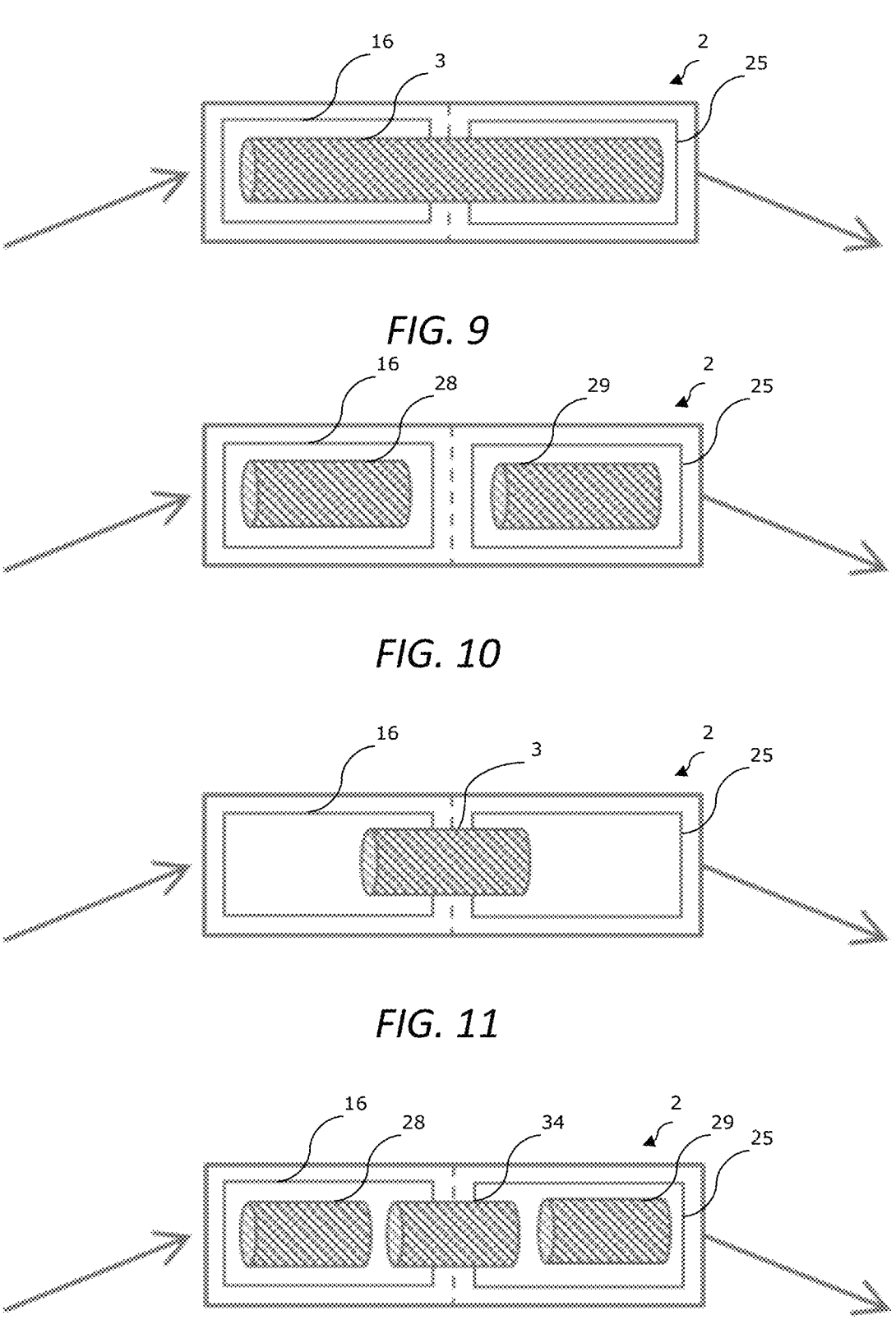
FIG. 9 shows the heating chamber equipped with a drum extending the full length of the first and second sections of the heating chamber.
FIG. 10 shows the heating chamber equipped with a first drum in the first heating chamber, and a second drum in the second section of the heating chamber.
FIG. 11 shows the heating chamber equipped with a drum extending from the first section of the heating chamber to the second section of the heating chamber, said drum occupying only part of the length of each first and second sections of the heating chamber.
FIG. 12 shows the heating chamber equipped with three drums.

FIGS. 9-12 show multiple configuration of a heating chamber (2) with one (3) or more drums (34, 35). FIG. 9 shows the heating chamber (2) equipped with a drum (3) extending the full length of the first and second sections of the heating chamber (16, 25). FIG. 10 shows the heating chamber (2) equipped with a first drum (28) in the first heating chamber (16), and a second drum (25) in the second section of the heating chamber (25). FIG. 11 shows the heating chamber (2) equipped with a drum (3) extending from the first section of the heating chamber (16) to the second section of the heating chamber (25), said drum (3) occupying only part of the length of each first and second sections of the heating chamber (16, 25). FIG. 12 shows the heating chamber (2) equipped with three drums (38, 29, 34). The first drum (28) being located in the first heating chamber (16), and the second drum (29) in the second section of the heating chamber (25), the third drum (34) is provided between said first and second drums (28, 29), the third drum (34) extending from the first section of the heating chamber (16) to the second section of the heating chamber (25).

Figure 13:
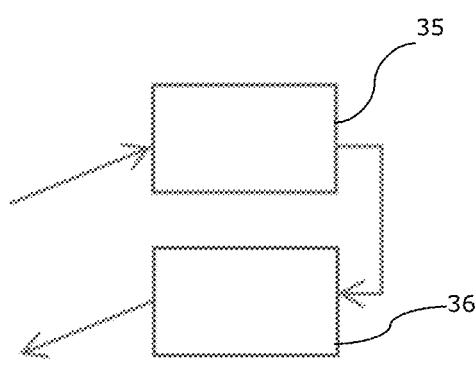
FIG. 13 shows the first heating chamber placed above the second heating chamber, the ends of the two heating chambers being connected by intermediate of a channel and/or conveyor.
Figure 14:
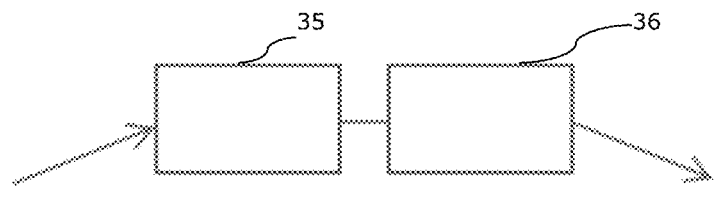
FIG. 14 shows the first heating chamber in substantial alignment with the second heating chamber, the two chambers being connected end-to-end by a channel and/or via a conveyor.
Figure 15:
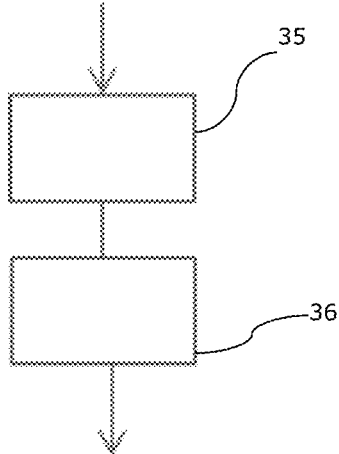
FIG. 15 shows the first heating chamber placed above the second heating chamber, the lateral surface of the two heating chambers being connected by intermediate of a channel and/or conveyor.
Figure 16:
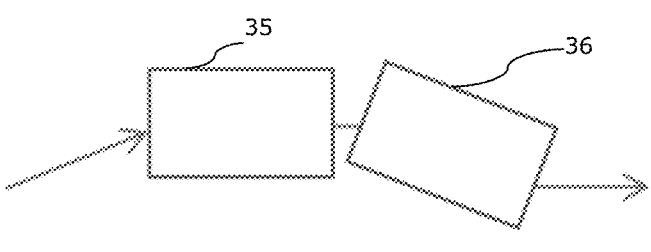
FIG. 16 shows the first heating chamber connected to a second heating chamber with the output opening lower than the axis of the first heating chamber.

FIGS. 13-16 show a schematic representation of the system (1) equipped with two heating chambers (35, 36) in communication with each other. The path of the textile products into, through and out of each heating chamber (35, 36) is shown in FIGS. 13-16 by the arrows. FIG. 13 shows the first heating chamber (35) placed above the second heating chamber (35), the ends of the two heating chambers (35, 36) being connected by intermediate of a channel and/or conveyor. The figure shows the input side of the first chamber (35) and the output side of the second chamber (36) directed towards the same side. FIG. 14 shows the first heating chamber (35) in substantial alignment with the second heating chamber (35), the two chambers (35, 36) being connected end-to-end by a channel and/or via a conveyor. FIG. 15 shows the first heating chamber (35) placed above the second heating chamber (35), the lateral surface of the two heating chambers (35, 36) being connected by intermediate of a channel and/or conveyor. FIG. 16 shows the first heating chamber (35) connected to a second heating chamber (35) with the output opening lower than the axis of the first heating chamber (35). The two chambers (35, 36) are connected end-to-end by a channel and/or via a conveyor.

It is supposed that the present invention is not restricted to any form of realization described previously and that some modifications can be added to the presented example of fabrication without reappraisal of the appended claims. For example, the heating chamber can be connected to an external super-heated steam circuit.

LIST OF NUMBERED ITEMS

1 oven system
2 heating chamber
3 rotating drum
4 platform
5 heater
6 piping
7 filter
8 fan
9 first conveyor
10 second conveyor
11 heat exchanger
12 first end of rotating drum
13 second end of rotating drum
14 tray
15 drum orifice
16 first section of the heating chamber
17 drum section of the heating chamber
18 Input opening
19 output opening
20 drum door
21 first shroud
22 second shroud
23 heated fluid inlet
24 heated fluid outlet
25 second section of the heating chamber
26 third conveyor
27 fourth conveyor
28 first rotating drum 29 second rotating drum
30 first end of first rotating drum
31 second end of first rotating drum
32 first end of second rotating drum
33 second end of second rotating drum
34 third rotating drum
35 first heating chamber
36 second heating chamber The present invention is in no way limited to the embodiments described in the examples and/or shown in the figures. On the contrary, methods according to the present invention may be realized in many different ways without departing from the scope of the invention.

The invention claimed is:

1. A system for disassembling textile products that are at least partially assembled with heat sensitive yarn, glues and/or heat-demountable rivets, the system comprising at least one heating chamber in connection with means for providing heated air of a temperature of at least 100° C. or superheated steam to the heating chamber and in connection with an outlet for releasing heated air or superheated steam from the heating chamber, said heating chamber having at least one opening through which clothing can enter said heating chamber wherein said system further comprises a rotating drum section comprising a drum, wherein said drum section is located within said heating chamber or configured to be moved in and out said heating chamber.

2. The system according to claim 1, wherein, the heating chamber has a first and second heating section.

3. The system according to claim 2, wherein, said first and second section are located upstream of said drum section.

4. The system according to claim 2, wherein, said drum section is located within said second heating section.

5. The system according to claim 1, wherein, said system comprises a transportation unit, for transporting said textile products through at least part of said heating chamber.

6. The system according to claim 5, wherein, said transportation element comprises at least two transportation sub-units, wherein each unit is set to a pre-defined speed.

7. The system according to claim 1, wherein, a section of the heating chamber is in connection with means to provide air, super-heated steam or inert gas heated to a temperature at least 20° C. lower than the temperature of every other section of the heating chamber.

8. The system according to claim 1, wherein, said drum in said drum section is equipped with orifices in the drum wall, for allowing the evacuation and/or presorting of disassembled textile, and wherein the orifices have a size of between 20 mm and 60 mm.

9. The system according to claim 8, wherein, the drum includes a rotatable cylindrical jacket disposed to the outer surface of said drum, said jacket having orifices similar in size and location to those of the drum.

10. The system according to claim 1, wherein, at least one of the walls of the heating chamber includes a platform configured to move at least one drum in and out of the heating chamber.

11. The system according to claim 10, wherein, the platform includes a surface configured to air-tightly close the heating chamber.

12. The system according to claim 1, wherein said system comprises a fan in fluid connection with a heater, which heater is in further connection with at least an inlet of the heating chamber.

13. A method for disassembling textile products that are at least partially assembled with heat sensitive yarn, glues, and/or heat-demountable rivets said disassembling occurs by means of a disassembling system comprising a heating chamber and a drum section comprising a drum, wherein said textile products are entered into said system and wherein said textile products are subjected to air of a temperature of at least 100° C., a heated inert gas or superheated steam while placed under mechanical stress by means of a tumbling and/or rotating motion, and wherein the air, heated inert gas, or superheated steam is released from the heating chamber via a connected outlet.

14. Method according to claim 13, comprising the steps of:
setting a disassembly temperature to be attained in the heating chamber;
heating and circulating at least one fluid until the set disassembly temperature is attained;
loading the system with textile products to be disassembled;
tumbling the textile products at the pre-set disassembly temperature in the drum section; and
retrieving the disassembled textile products from the drum section.

15. Method according to claim 13, wherein, the step of loading the drum section with textile products to be disassembled is preceded by a step of pre-heating the textile products in a first heating section of the heating chamber.

16. Method according to claim 13, wherein, the step of pre-heating the textile products is preceded by a step of heating and circulating at least one fluid in the first section until the a temperature at least 20° C. above the set disassembly temperature is attained.

17. Method according to claim 13, wherein, said textile products are heated in a two-step heating process, wherein the temperature in the second heating step will be lower, preferably at least 20° C. lower, than the temperature in the first heating step, wherein in at least one step superheated steam is used as source of heating.

18. Method according to claim 13, wherein, if the oxygen concentration inside the heating chamber is above 10%, heating of the heating chamber is carried out with superheated steam or heated inert gas.

19. Method according to claim 13, wherein, the fluid used is superheated steam, which superheated steam is provided to the heating chamber by a steam generator or boiler.

20. Method according to claim 13, wherein, said disassembling comprises at least partially removing textile components such as buttons, zippers or rivets from said textile products, wherein said removed textile components are evacuated from said system by means of orifices present in said drum.

\* \* \* \* \*